Jan. 1, 1946.   V. S. HARRISON   2,391,966
ACCELEROMETER
Filed May 18, 1944
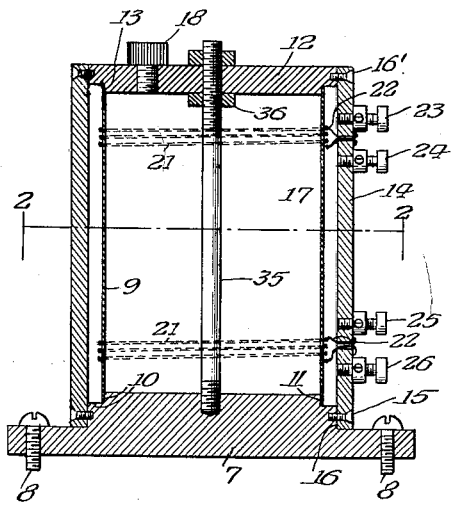
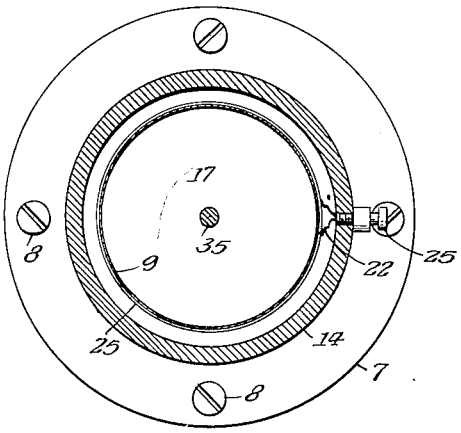
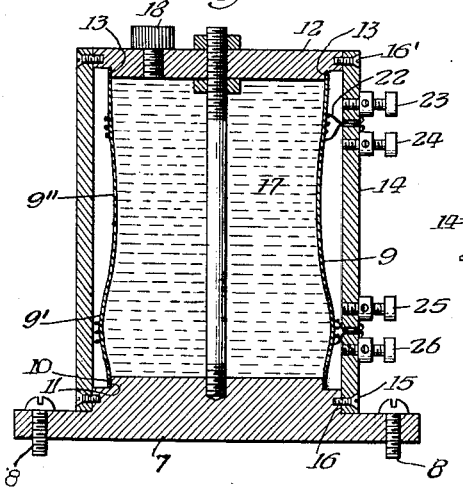
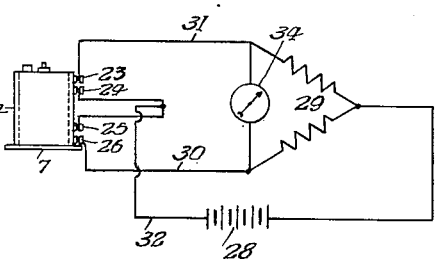
INVENTOR.
Verne S. Harrison
By Fred Gerlach
His Atty.

Patented Jan. 1, 1946

2,391,966

UNITED STATES PATENT OFFICE 2,391,966

ACCELEROMETER

Verne S. Harrison, San Diego, Calif., assignor to Consolidated Vultee Aircraft Corporation, San Diego, Calif., a corporation of Delaware Application May 18, 1944, Serial No. 536,222

7 Claims. (Cl. 201—48)

The invention relates to accelerometers of the type embodying electrical means for measuring acceleration.

One object of the invention is to provide an improved accelerometer which includes a body containing a liquid and in which the liquid pressure is varied by dynamic acceleration and elements which are sensitively responsive to such pressure variations.

Another object of the invention is to provide an accelerometer which is simple in construction and efficient in operation.

Other objects of the invention will appear from the detailed description.

The invention consists in the several novel features hereinafter set forth and more particularly defined by claims at the conclusion hereof.

In the drawing:

Fig. 1 is a longitudinal section of an accelerometer embodying the invention.

Fig. 2 is a section taken on line 2—2 of Fig. 1.

Fig. 3 is a longitudinal section with the fluid cylinder as it is distorted by pressure.

Figure 4 is a diagram of an electric circuit for the accelerometer.

The invention is exemplified in an accelerometer which comprises a rigid base 7 which is adapted to be attached by screws 8 to any moving part, the acceleration of which is to be measured; a cylinder 9 having a thin flexible wall, for example, .005" in thickness, and formed of shim stock or spring steel; a rigid head or cover 12; and a rigid cylindrical shell 14. The lower end of the wall of tubular member 9 fits around and is soldered at 10 to an annular surface 11 on the integral portion of the base 7. The upper end of the wall of tubular member 9 fits around and is soldered at 13 to an annular surface on the head or cover 12. Base 7 and head 12 form closures for the ends of the cylinder 9 and with it form a closed or sealed chamber 17 which is adapted to be filled with a suitable liquid, such as mercury, and to confine the fluid therein so that axial acceleration of the moving part in either direction will cause the pressure of the liquid to be increased in one end of the chamber 17 and decreased in the other end of the chamber. The wall of cylinder 9 is so thin that it is expansibly deformable or flexible by an increase of pressure and contractibly deformable or flexible by a decrease of pressure in the liquid in the different longitudinal portions of the chamber 17. The lower end of the shell 14 fits around and is secured by screws 15 on a shoulder 16 on the base 7. The upper end of shell 14 fits around the periphery of the head 12 and is fixedly secured thereto by screws 16'. The rigid shell 14 exemplifies means for securing the base 7 and cover or head 12 in fixed longitudinally spaced relation so that the variations in the pressure of the liquid in different longitudinal portions of the chamber will result only in deformation of the thin tubular wall of cylinder 9. Shell 14 also serves as a protective enclosure for the cylinder 9. An opening is provided in the head 12 for filling the chamber 17 and is closed by a screw plug 18.

The base 7 is mounted on a moving part in such manner that acceleration of the moving part in either direction will force the liquid axially toward one end of the chamber 17 and increase its pressure adjacent that end and decrease the pressure of the liquid adjacent the opposite end of the chamber 17. As a result, acceleration of the moving part and the body of liquid in either direction axially will cause the liquid to expand or bulge a portion 9' of the thin wall adjacent one end of the cylinder 9 and to contract or strain inwardly the portion 9" of said thin wall adjacent the opposite end of the chamber 17, as indicated in Fig. 3, in which the deformations are somewhat exaggerated for illustrative purposes.

Several convolutions of fine strain sensitive insulated resistance wire 21, for example .0017" in thickness, are wrapped helically around and cemented on the outer periphery of the cylinder 9 near its ends, respectively, so that each wire will constitute an element which will be stretched or contracted by the changes in pressure of the liquid in different longitudinal portions of the chamber 17 and the differential stresses or deformations produced in different longitudinal portions of cylinder 9. Each wire functions as an electric strain gauge, the resistance value of which varies responsively and proportionately to the expansion and contraction of the portion of the cylinder 9 to which it is secured. These resistance wires are spaced apart longitudinally on the cylinder 9 so they will be differentially responsive to deformations in the wall of cylinder 9 produced by the increase and decrease of liquid pressures in different longitudinal portions of the chamber 17. Each end of each wire 21 has soldered thereto a lead conductor 22 which extends through the shell 14. The conductors 22 on one of the gauges are connected to binding posts 23 and 24 and the conductors 22 on the other gauge are connected to binding posts 25 and 26. These binding posts are mounted on the shell 14 and are connected to an electric circuit for actuating a recording device, such as a cathode ray oscillograph or a high frequency recording light-beam galvanometer, as illustrated in Fig. 4. This electric circuit includes a battery 28, one pole of which is connected to a Wheatstone bridge 29, the legs of which are connected respectively by conductors 30 and 31 to the binding posts 23 and 26. The resistance in the legs of the Wheatstone bridge are of equal value and are equal to the gauges formed by the resistance wires 21, 21. A conductor 32 is connected to the other pole of the battery 28 and has branches connected to the binding posts 24, 25. A recording instrument 34 responsive to fluctuations in the current responsive to the changes produced by the contraction and expansion of the resistance wires, is connected across the conductors 30, 31 between the legs of the Wheatstone bridge and the gauges. This instrument may be a cathode ray oscillograph or a high frequency recording light-beam galvanometer. The accelerometer may be calibrated before it is put into use and a chart prepared whereby readings can be taken on the recording device which will indicate the specific accelerations in the moving element being tested.

The operation will be as follows: Assuming the base 7 to be secured to a moving part, the acceleration of which is to be measured, so that the cylindrical axis of the chamber 17 will be parallel to the direction of motion of the moving part and said chamber, acceleration will increase the pressure of the liquid adjacent one end of the cylinder 9 and decrease the liquid pressure near the opposite end of the chamber 17. These pressure changes will cause the thin wall of cylinder 9 to bulge or flex outwardly as indicated at 9' in the end of the chamber 17 where the greater pressure has been produced, and simultaneously cause the thin wall to contract or flex as indicated at 9" in the end of the chamber where the pressure has been decreased by the acceleration. The resistance wire 21 around the bulged portion 9' of the cylinder 9 will be stretched so as to increase its resistance value to the current through one leg of the Wheatstone bridge 29 and the resistance wire 21 around the other portion 9" of the cylinder 9 will contract so as to decrease its resistance value to the flow of current through the other leg of the Wheatstone bridge. This produces an unbalance in the Wheatstone bridge by the increase of the resistance value of the gauge connected to one leg of the Wheatstone bridge 29 and a decrease of resistance value of the other gauge which is connected to the other leg of the Wheatstone bridge. The differential in the pressures from increase and decrease produces differential resistance values in the gauges. These changes are proportionate to the expansion and contraction or flexing of the different longitudinal portions of the wall of the cylinder 9 by pressure variations of the liquid in the different portions of the cylinder.

During operation, base 7 and head 12 are fixedly secured by a shell 14 against relative longitudinal movement so that the liquid pressure in chamber 17 will distort or flex the thin wall of cylinder 9 radially and does not elongate said chamber. This results in stretching and contracting the wires 21, respectively, by the pressure stresses and deformations in the wall of cylinder 9 proportionately to the acceleration and renders the instrument sensitive and efficient in the measurement of accelerations. The relative variations of the current voltage in the legs of the Wheatstone bridge will operate the galvanometer 34 to record the accelerations and decelerations of the moving parts.

For accurately spacing the base 7 and the head 12 during their assembly with the cylinder 9, the stem 35 is screw-threaded into the base 7 and provided at its upper end with nuts 36 by which the base 7 and head 12 may be accurately positioned for connecting them so they will be longitudinally spaced as desired.

The pressure forces of the liquid and the stresses upon the thin walled cylinder will depend on the height of the cylinder, the area of its wall, the strength and thickness of the walls, and the specific gravity of the liquid and upon acceleration. With a suitable predetermined height of the cylinder, area, strength and thickness of its wall, and density of the liquid, the pressure stresses of the liquid will vary proportionately to the forces produced by acceleration for measuring various forms of acceleration in different uses.

The accelerometer is adapted for measuring various forms of acceleration, such as vibration, centrifugal forces produced on a sharp turn, shock or jar or any other dynamic force of a similar nature. A characteristic of the construction described is that temperature fluctuations will not affect the measurement since the dynamic pressure differences are effected by the inertia of the liquid. The problem of resonance is not present.

The invention exemplifies an accelerometer which includes strain gauges which are sensitively responsive proportionately to pressure changes of the liquid in a sealed chamber, which is simple in construction, and efficient in operation.

The invention is not to be understood as restricted to the details set forth, since these may be modified within the scope of the appended claims without departing from the spirit and scope of the invention.

Having thus described the invention, what I claim as new and desire to secure by Letters Patent is:

1. An accelerometer comprising: a cylinder containing a body of liquid and having a sufficiently thin wall to be flexed by variations of liquid pressure in the cylinder, rigid heads to which the ends of the cylinders are fixedly attached and sealed, means for securing the heads and ends of the cylinders in fixed longitudinally spaced relation and the cylinder against axial elongation and for confining the variations in the cylinder to diametric expansion and contraction, and a strain-sensitive electric resistance element secured on the outer periphery of the cylinder and variably responsive to the diametric expansion and contraction of the cylinder by the liquid.

2. An accelerometer comprising: a cylinder containing a body of liquid and having a sufficiently thin wall to be flexed by variations of liquid pressure in the cylinder, rigid heads to which the ends of the cylinders are fixedly attached and sealed, means for securing the heads and the ends of the cylinders in fixed longitudinally spaced relation and the cylinder against axial elongation for confining the variations in the cylinder to diametric expansion and contraction, and a strain-sensitive electric resistance wire helically wrapped around the outer periphery of the cylinder and variably responsive to the diametric expansion and contraction of the cylinder by the liquid.

3. An accelerometer comprising: a cylinder containing a body of liquid and having a sufficiently thin wall to be flexed by variations of liquid pressure in the cylinder, rigid heads to which the ends of the cylinders are fixedly attached and sealed, a casing enclosing the cylinder for securing the heads and the ends of the cylinders in fixed longitudinally spaced relation and the cylinder against axial elongation and for confining the variations in the cylinder to diametric expansion and contraction, and a strain-sensitive electric resistance element circumferentially wrapped around the outer periphery of the cylinder and variably responsive to the diametric expansion and contraction of the cylinder by the liquid.

4. An accelerometer comprising: a cylinder containing a sealed body of liquid and having a sufficiently thin wall to be flexed by variations of liquid pressure localized in different longitudinal portions of the cylinder, rigid heads to which the ends of the cylinders are attached and sealed, means for securing the heads and cylinder ends in fixed longitudinally spaced relation and the cylinder against axial elongation and confining the deflection of the cylinder to diametric expansion and contraction, and strain-sensitive electric resistance elements circumferentially wrapped around different longitudinal portions of the cylinder and responsive to the diametric expansion and contraction in said different portions of the cylinder by the liquid.

5. An accelerometer comprising: a cylinder containing a sealed body of liquid and having a sufficiently thin wall to be flexed by variations of liquid pressure localized in different longitudinal portions of the cylinder, rigid heads to which the ends of the cylinders are attached and sealed, a casing around the cylinder, for securing the heads and cylinder ends in fixed longitudinally spaced relation and the cylinder against axial elongation, and confining the deflection of the cylinder to diametric expansion and contraction, and strain-sensitive electric resistance elements around different longitudinal portions of the outer periphery of the cylinder and responsive to the diametric expansion and contraction in said different portions of the cylinder by the liquid.

6. An accelerometer comprising: a cylinder containing a sealed body of liquid and having a sufficiently thin wall to be flexed by variations of liquid pressure localized in different longitudinal portions of the cylinder, rigid heads to which the ends of the cylinders are fixedly attached and sealed, means for securing the heads and cylinder ends in fixed longitudinally spaced relation, and the cylinder against axial elongation, and confining the deflection of the cylinder to diametric expansion and contraction, and strain-sensitive electric resistance wires helically wrapped around different longitudinal portions of the outer periphery of the cylinder and responsive to the differential diametric expansion and contraction in said portions of the cylinder by the liquid.

7. An accelerometer comprising: a cylinder containing a body of liquid and having a sufficiently thin wall to be flexed by variations of liquid pressure in the cylinder, rigid heads to which the ends of the cylinders are fixedly attached and sealed, a casing for securing the heads and the ends of the cylinders in fixed longitudinally spaced relation and the cylinder against axial elongation for confining the variations in the cylinder by diametric expansion and contraction, a strain-sensitive electric resistance element wrapped around the cylinder and variably responsive to the diametric expansion and contraction of the cylinder by the liquid, and means for spacing the heads apart while the heads and casing are being secured together.

VERNE S. HARRISON.